(12) United States Patent
Barsuk (10) Patent No.: US 7,457,871 B2
(45) Date of Patent: Nov. 25, 2008

(54) SYSTEM, METHOD AND PROGRAM TO IDENTIFY FAILED COMPONENTS IN STORAGE AREA NETWORK

(75) Inventor: Vyacheslav Barsuk, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 848 days.

(21) Appl. No.: 10/960,866

(22) Filed: Oct. 7, 2004

(65) Prior Publication Data

US 2006/0080430 A1    Apr. 13, 2006

(51) Int. Cl.
*G06F 15/173*   (2006.01)

(52) U.S. Cl. ............... 709/224; 709/223; 709/238; 709/242; 714/18; 714/25; 714/30; 714/45; 714/48

(58) Field of Classification Search ......... 709/223, 709/224, 238, 242; 714/18, 25, 30, 45, 48, 714/56

See application file for complete search history.

(56) References Cited

U.S. PATENT DOCUMENTS

| | | | | |
|---|---|---|---|---|
| 5,392,328 | A |  2/1995 | Schmidt et al. ............... 379/10 |
| 5,812,556 | A |  9/1998 | Schmidt ........................ 371/3 |
| 6,411,599 | B1 * |  6/2002 | Blanc et al. ................. 370/219 |
| 6,636,981 | B1 * | 10/2003 | Barnett et al. .................. 714/4 |
| 6,700,868 | B2 * |  3/2004 | Smith et al. ................. 370/217 |
| 6,711,612 | B1 * |  3/2004 | Blumenau et al. ........... 709/223 |
| 6,775,230 | B1 * |  8/2004 | Watanabe et al. ............ 370/228 |
| 6,850,704 | B1 * |  2/2005 | Dave ............................. 398/2 |
| 7,043,663 | B1 * |  5/2006 | Pittelkow et al. ................ 714/4 |
| 7,076,688 | B2 * |  7/2006 | Yamamoto ..................... 714/6 |
| 7,113,988 | B2 * |  9/2006 | Chirashnya et al. ......... 709/224 |

(Continued)

OTHER PUBLICATIONS

IBM Technical Disclosure Bulletin vol. 38, No. 06 Jun. 1995 pp. 451-458.

*Primary Examiner*—William C. Vaughn, Jr.
*Assistant Examiner*—Saeed S Mirzadegan
(74) *Attorney, Agent, or Firm*—Arthur J. Samodovitz (57) ABSTRACT

System, method and computer program product for identifying a failed component in a system comprising application servers, storage servers and a switch fabric. The switch fabric has first ports coupled to the application servers, second ports coupled to third ports of the storage servers and internal switches to interconnect the first ports to second ports. Each of the application servers compiles records of its own attempts to communicate with the storage servers via the switch fabric. Each of the records indicates one of the third ports and one of the storage servers for each of the communication attempts. From the records a determination is made if any of the communications was successful to one of the storage servers. If not, a determination is made that the one storage server may have failed. If any of the communications was successful to the one storage server, a determination is made that the one storage server is active and a determination is made from the records if any of the communications was successful to each of the third ports of the one storage server. If not, a determination is made that each of the third ports of the one storage server may have failed. If any of the communications was successful to each of the third ports, a determination is made that each of the third ports of the one storage server is active. According to a feature of the present invention, a determination is also made based on the records if a switch or first port has failed.

6 Claims, 5 Drawing Sheets

U.S. PATENT DOCUMENTS

| | | |
|---|---|---|
| 7,124,139 B2 * | 10/2006 | Nemoto et al. ............... 707/100 |
| 7,194,538 B1 * | 3/2007 | Rabe et al. .................. 709/224 |
| 7,260,628 B2 * | 8/2007 | Yamamoto et al. ........... 709/224 |
| 7,343,524 B2 * | 3/2008 | Klotz et al. .................... 714/39 |
| 2003/0149761 A1 * | 8/2003 | Baldwin et al. ............. 709/224 |
| 2003/0163562 A1 * | 8/2003 | Ford et al. .................. 709/224 |
| 2003/0212785 A1 * | 11/2003 | Jibbe .......................... 709/224 |
| 2004/0049564 A1 * | 3/2004 | Ng et al. ..................... 709/223 |
| 2004/0049572 A1 * | 3/2004 | Yamamoto et al. ........... 709/224 |
| 2004/0068561 A1 * | 4/2004 | Yamamoto et al. ........... 709/224 |
| 2004/0153844 A1 * | 8/2004 | Ghose et al. ................... 714/42 |
| 2004/0181709 A1 * | 9/2004 | Gibson et al. ................. 714/25 |
| 2005/0015685 A1 * | 1/2005 | Yamamoto ................... 714/54 |
| 2005/0071482 A1 * | 3/2005 | Gopisetty et al. ........... 709/229 |
| 2005/0108375 A1 * | 5/2005 | Hallak-Stamler ........... 709/223 |
| 2006/0075089 A1 * | 4/2006 | Alam et al. ................. 709/224 |

\* cited by examiner

SYSTEM, METHOD AND PROGRAM TO IDENTIFY FAILED COMPONENTS IN STORAGE AREA NETWORK

BACKGROUND OF THE INVENTION

The invention relates generally to computer systems, and deals more particularly with a technique to identify a failed component which prevents an application server from accessing storage via a switch fabric and a storage server.

It is known to allow application servers to access storage via a switch fabric, storage servers and respective disk drives. The storage servers can be IBM Enterprise Storage Servers ("ESS"), and the switch fabric can be an IBM Storage Area Network ("SAN") switch fabric. The known switch fabric comprises a first set of switch ports to connect to respective application servers and a second set of switch ports to connect to respective storage servers. The known switch fabric also comprises internal switches to interconnect switch ports of the first set to switch ports of the second set, and control circuitry to determine which switch ports of each set to interconnect to forward an application request to the desired storage server. In the IBM SAN switch fabric, there are fiber channel (protocol) adapter cards plugged into the application servers, the switch fabric and the storage servers, and the first and second sets of switch ports are fiber channel ports. The storage servers manage disk drives and associated disk storage, and manage requests from the application servers to read from or write to the storage. Applications within the application servers address locations in the storage by a "virtual path" and then an address range. Each application server includes configuration data which maps each virtual path to a respective hard disk or other real address in the storage. Each application server includes other system configuration data which specifies which hard disks can be accessed via which fiber channel adapter card port of the application server. Consequently, when an application specifies a virtual path (and address range) from which to read data or to which to write data, the operating system in the application server translates the virtual path to a hard disk and identifies the fiber channel adapter card port of the application server through which to send the request en route to a storage server which manages the hard disk. Then, the operating system sends the request through this fiber channel adapter card port to the switch fabric. The switch fabric then determines from its own data which switch port of the second set is connected to the storage server which managers the hard disk specified in the application request, and interconnects the switch port of the first set connected to the application server to the switch port of the second set which manages the specified hard disk. Then, the switch fabric forwards the request to the storage server via this switch port of the second set. In some environments such as the IBM ESS environment, the applications read and write data in units called "Logical Units" of ("LUNS"), so the switch fabric converts the address range of the application request to logical units. After handling the application request, the storage server sends a response back to the application via the switch fabric using the same two switch ports.

Occasionally, there is a failure or other problem with one of the application servers, application server ports, cables leading from the application server to the switch fabric, switch fabric switch port of the first set, internal switch fabric switches, switch fabric switch port of the second set, cables leading from the switch fabric to the storage server, storage server ports, storage server, disk drive or disk storage. Consequently, when an application makes a request to read from or write data to storage via the switch fabric and a storage server, and a failure occurs with the application server or the storage server or the communication link between the application server and storage server, an code or nothing is returned. Then, an administrator attempts to determine the failed component from the large amount of data that is available. Normally each component that could possibly have failed is analyzed separately to determine if it has failed. This may require access to the storage servers and switch fabric switches.

An object of the present invention is to determine the cause of a failure when an application in an application server attempts to read from or write to storage via a switch fabric and storage server.

Another object of the present invention is to determine the cause of failure without requiring a special program agent on the switch fabric or storage server.

SUMMARY OF THE INVENTION

The invention resides in a system, method and computer program product for identifying a failed component in a system comprising application servers, storage servers and a switch fabric. The switch fabric has first ports coupled to the application servers to receive requests to access storage managed by the storage servers. The switch fabric also has second ports coupled to third ports of the storage servers to forward the access requests to the storage servers and receive responses from the storage servers. The switch fabric also has internal switches to interconnect the first ports to second ports to pass the requests and responses through the switch fabric. Each of the application servers compiles records of its own attempts to communicate with the storage servers via the switch fabric. Each of the records indicates one of the third ports and one of the storage servers for each of the communication attempts. From the records a determination is made if any of the communications was successful to one of the storage servers. If not, a determination is made that the one storage server may have failed. If any of the communications was successful to the one storage server, a determination is made that the one storage server is active and a determination is made from the records if any of the communications was successful to each of the third ports of the one storage server. If not, a determination is made that each of the third ports of the one storage server may have failed. If any of the communications was successful to each of the third ports, a determination is made that each of the third ports of the one storage server is active.

According to a feature of the present invention, each of the records also indicates one of the first ports and one of the switches for each of the communication attempts. From the records a determination is made if any of the communications was successful to each of the switches leading to each of the third ports of the one storage server. If not, a determination is made that each of the switches may have failed. However, if any of the communications was successful to each of the switches leading to each of the third ports of the one storage server, a determination is made that each of the switches is active and a determination is made from the records if any of the communications was successful to each of the first ports connected to each of the switches leading to the one storage server. If not, a determination is made that each of the first ports connected to each of the switches leading to the one storage server or a connection between one of the application servers and each of the first ports connected to each of the switches leading to the one storage server may have failed. However, if any of the communications was successful to each of the first ports connected to each of the switches leading to the one storage server, a determination is made that each of the first ports connected to each of the switches leading to the one storage server is active.

DETAILED DESCRIPTION OF THE PREFERRED EMBODIMENTS

Figure 1:
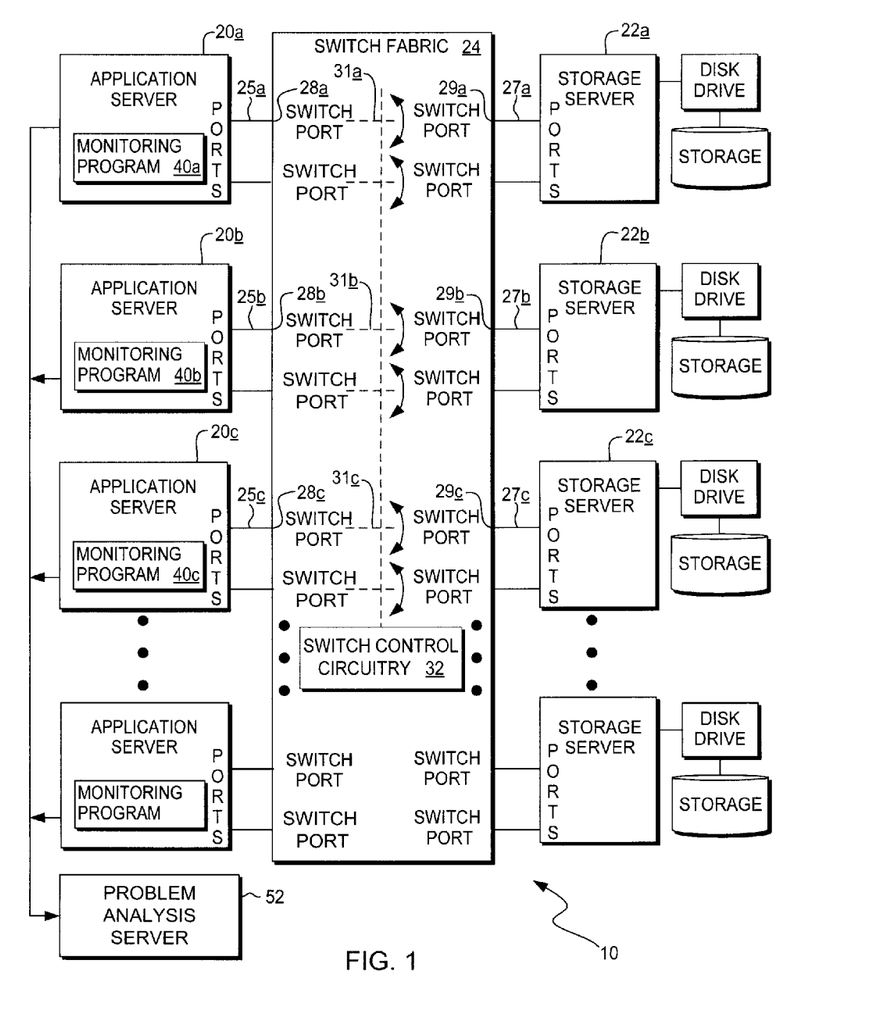
FIG. 1 is a block diagram of a computer system comprising application servers, storage servers, disk drives, disk storage, a switch fabric interconnecting the application servers with the storage servers, a problem analysis server and monitoring programs within the application servers and a problem analysis program within the problem analysis server according to the present invention.

The present invention will now be described in detail with reference to the figures, where like reference numbers indicate like components. FIG. 1 illustrates a computer system generally designated 10 which embodies the present invention. Computer system 10 comprises a multiplicity of application servers 20a,b,c, . . . , a multiplicity of storage servers 22a,b,c, . . . , a switch fabric 24 logically located between the application servers and the storage servers, cables (or other network connections) 25a,b,c . . . connecting the application servers to the switch fabric, and cables (or other network connections) 27a,b,c . . . connecting the switch fabric to the storage servers. The switch fabric 24 comprises a first multiplicity of switch ports 28a,b,c . . . such as fiber channels ("FCs") ports to communicate with the application servers, and a second multiplicity of switch ports 29a,b,c . . . such as fiber channel ports to communicate with the storage servers. However, other types of ports and protocols can also be used between the application servers and the switch fabric and between the switch fabric and the storage servers. The switch fabric also comprises a multiplicity of internal switches 31a, b,c . . . ; each switch can interconnect any switch port 28a,b, c . . . to any switch port 29a,b,c . . . as determined by control circuitry 32 within the switch fabric. In this embodiment of the present invention, each switch can interconnect two or more switch ports 28a,b,c . . . to one of the switch ports 29a,b,c . . . . Computer system 10 also comprises a multiplicity of disk drives 26a,b,c . . . and associated disk storages 28a,b,c . . . managed by respective storage servers 22a,b, c . . . .

Figure 2:
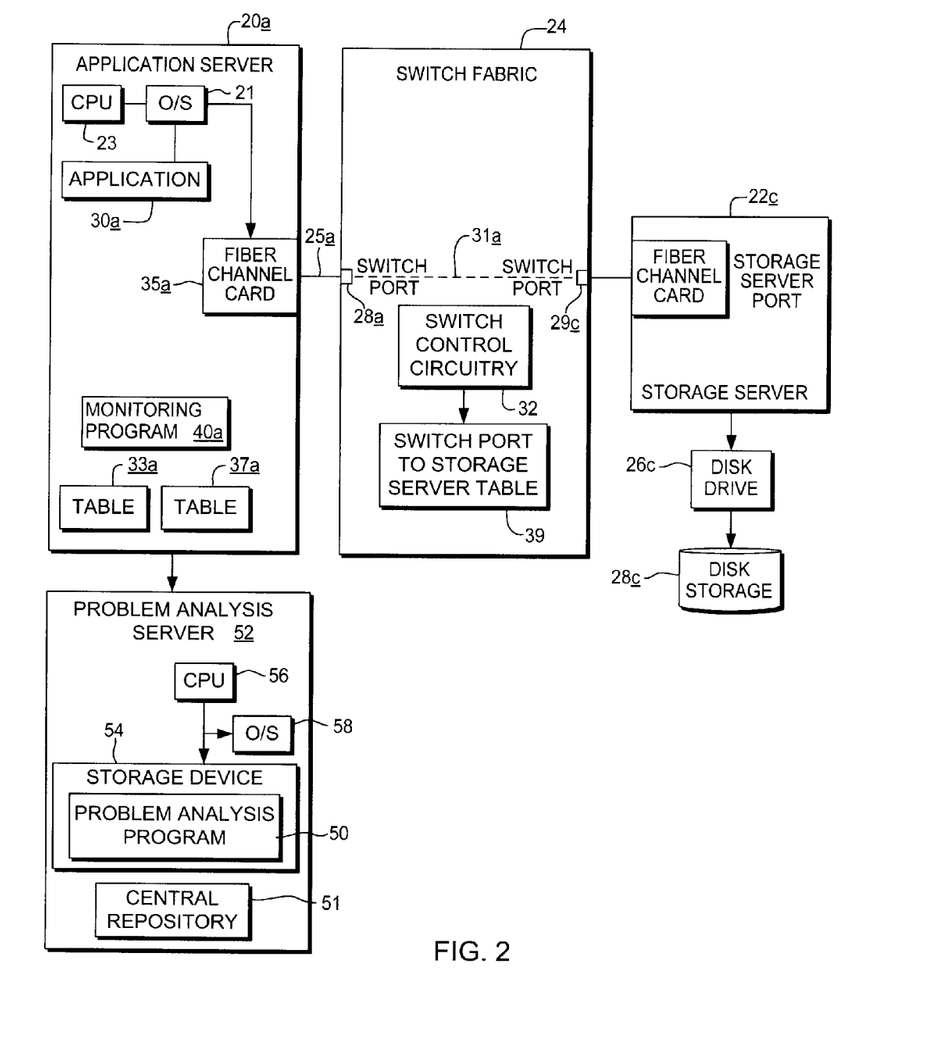
FIG. 2 is a more detailed block diagram of one of the application servers, the switch fabric, one of the storage servers, one of the disk drives and one of the disk storages of the computer system of FIG. 1.

As explained in more detail below and illustrated in FIG. 2, an application program 30a within application server 20a makes a request to read from or write to an address range beginning with a virtual or logical address. In IBM pSeries application servers, this virtual or logical address is called a virtual path or "vpath", although other types of virtual or logical addresses can also be used. The application request is passed to an operating system 32 within the application server 20a which (executing on CPU 23) translates the virtual address to an identity of a storage disk or hard disk such as storage disk 26c and the name of a storage server which manages access to this disk. This translation is based on a configuration file 33a within the application server 20a. (It is also possible that the application can specify the hard disk directly, if the application has access to the configuration file 33a.) Then, application server 20 can determine a connection path to switch fabric 24 as follows. In the illustrated embodiment, each application server has one or more fiber channel adapter cards such as fiber channel adapter card 35a (or other protocol communication hardware) which converts the application request to fiber channel protocol (or other applicable protocol). Each fiber channel adapter card port is hardwired to a respective one of the switch ports 28a,b,c . . . . The operating system 21 determines from another configuration file 37a the fiber channel adapter card port to link to the specified hard disk, and passes the application request to this fiber channel adapter card port. (The configuration file 37a also identifies a switch within the fabric switch used by each switch port 28a,b,c . . . .) The fiber channel adapter card then sends the application request to a switch port (such as switch port 28a) via this fiber channel adapter card port and the associated cabling 25a. The request specifies the storage disk or hard disk which the application 30a requests access. From this specification, the switch fabric control circuitry 32 identifies from a table 39 which storage server (such as storage server 22c) manages the specified hard disk and which switch port (such as switch port 29c) is connected to this storage server. Then, the control circuitry 29 connects the switch port 28a to the switch port 29c and forwards the application request to the storage server 22c via cabling 27c. The storage server then accesses the hard disk via the corresponding disk drive (such as disk drive 26c) as requested in the application request. The foregoing connection within the switch fabric (between switch port 28a and switch port 29c) remains open for the return communication from the storage server 22c after accessing the hard disk 28c. The foregoing arrangement and operation of application servers, switch fabric, storage servers, disk drives and disk storage is Prior Art.

In accordance with the present invention, monitoring programs 40a,b,c . . . within respective application servers 20a, b,c . . . record communication attempts between their own application servers and different storage servers via the switch fabric. The monitoring programs also compile these records and supply to the problem analysis server 52 the compilation of these records, including a description of each communication path or link and an indication of success or failure of each communication attempt. A problem analysis program 50 is stored on a Computer Readable Medium such as storage device 54 in server 52 for execution by a CPU 56 under control of an operating system 58. In the event of a failure, the problem analysis program 50 automatically identifies the failed component based on the compiled records.

The record of each communication attempt, generated by the each monitoring program for its own application server, can be indexed by the target hard disk and is a function of three parameters:

hard disk$_i$ ($S_i$, $F_i$, $E_i$), where i=1 . . . $N_h$, where $S_i$ represents status (i.e. active or failed) of a logical connection or link from the application server to the storage server, i.e. from the application server, through a cable 25a,b,c . . . , through a switch port 28a,b,c . . . , through an internal switch within the switch fabric, through a switch port 29a,b,c . . . , through a cable 27a,b,c . . . , and to the storage server.

$F_i$ represents the connection from an application server to the switch fabric, i.e. from the application server, through a cable 25a,b,c . . . , through a switch port 28a,b,c . . . and to an internal switch. $F_i$ specifies a combination of the switch port 28a,b,c . . . adjacent to the application server and an internal switch within the switch fabric used by this switch port, and can assume as many values as the number of switch ports 25a,b,c . . . . Thus, the specification of $F_i$ identifies an internal switch and a switch port 28a or b or c . . . .

$E_i$ represents endpoint connectivity at the storage server port. $E_i$ specifies a storage server and storage server port, and can assume as many values as the number of ports on the storage server.

In the illustrated embodiment, the communication path or link from an application server to a storage server is represented by these three parameters, $S_i$, $F_i$ and $E_i$, because the values for these three parameters are all known by the application server that initiates the communication. There is no need for a program agent within the switch fabric to report the values for any of these three parameters. (The application server will not ordinarily know which switch fabric internal switch or which switch port 27a,b,c . . . are used for the link, and this is not required for problem determination in the present invention). Thus, the records supplied by the monitoring programs 40a,b,c . . . to the problem analysis program 50 are correlated to the links where each link is represented as (Si,Fi,Ei). Several hard disks can be accessed via the same link. Based on these three parameters, each hard disk which shares the same link, will have the same status (i.e. active or failed) based on the status of the link that they share. (As seen by the operating system 21 in the application server, an identity of a hard disk is the access path to the storage server for this hard disk.) This is because a problem with any of the Fi or Ei components of the link affects connectivity to all hard disks accessed via this link. Each record supplied by a monitoring program (such as monitoring program 40a) within an application server (such as application server 20a) will also identify the target hard disk "M", and can take the following form:

link$_i$ ($S_i$,$F_i$,$E_i$,$M_i$), i=1 . . . $N_1$ where $S_i$ is a status of link, $F_i$ is a switch port 25a,b,c . . . adjacent to the application server, $E_i$ is a storage server port at the endpoint of the link, $M_i$ is the identity of the target hard disk which is attempted to be accessed via the $F_i$, $E_i$ link, (there are typically more than one hard disk that can be accessed via each link), and $N_1$ is the identity of the link leading to the target hard disk, (typically, M>N).

Figure 3:
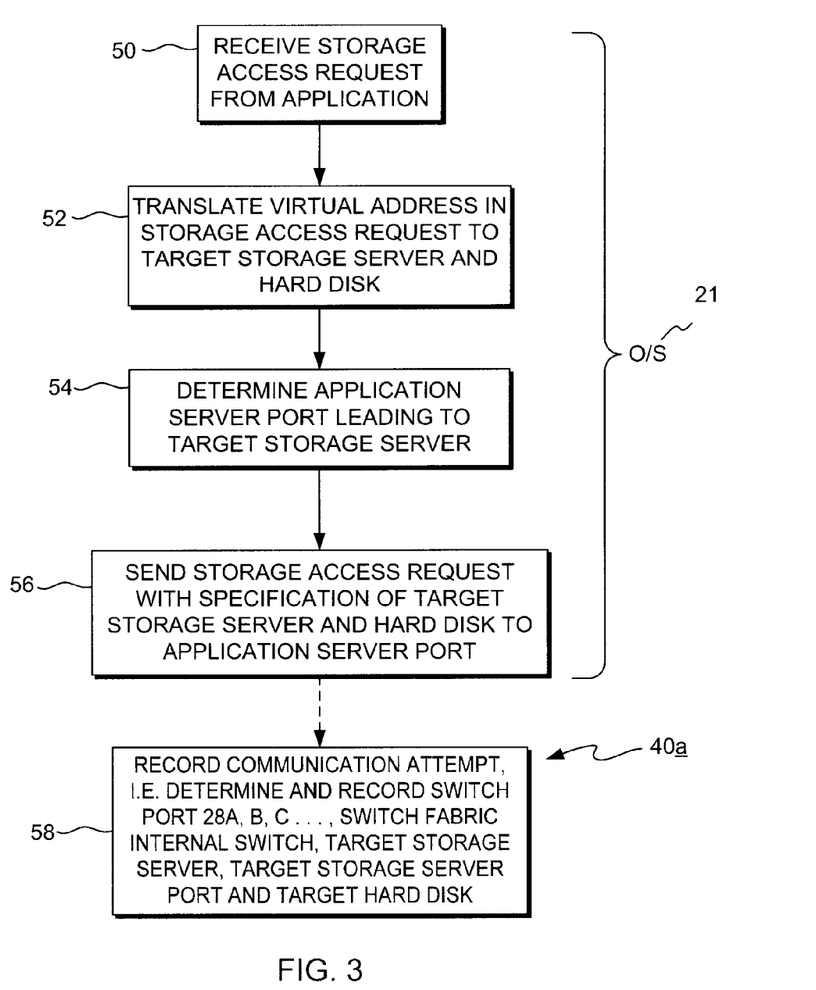
FIG. 3 is a flow chart illustrating certain functions of an operating system and monitoring program of an application server of FIG. 1 which attempts to communicate with a storage server and records details of the attempt and the result of the attempt.

FIG. 3 illustrates the function of the operating system 21 in processing an application request to link to storage server 22c, and the function of monitoring program 40a in recording the path of the link and the status of the communication attempt. Application program 30a in application server 20a makes a request to access data and provides the virtual or logical address (and address range) of the data. Operating system 32a receives the request (step 50), and by consulting table 33a, translates the virtual address to an identity of a hard disk that contains the data sought to be accessed and the name of the storage server that manages this hard disk (step 52). The operating system also determines from table 37a, the fiber channel adapter card port on the application server 20a to use to connect to this storage server via the switch fabric 24 (step 54). This fiber channel adapter card port is hard wired to switch port 28a on the switch fabric 24. Then, if there are no problems with the fiber channel adapter card port, cable 25a or switch port 28a, the operating system 32a sends the application request including the identity of the target storage server and hard disk to the switch fabric switch port 28a (step 56). In response, the control circuitry 32 determines from a table 31 which switch port (such as switch port 27c) is connected to target storage controller which manages the target hard disk, and interconnects switch port 28a to switch port 29c via one of the switches 31a,b,c . . . . If there is no problem with the switch fabric, switch port 29c, cable 27c or port of the target storage server, the switch fabric forwards the application request to the target storage server. If there are no problems with the storage server and target disk drive and hard disk, the storage server accesses the requested data, and responds to the application request via the same switch ports 29c and 28a. Operating system 21 constantly monitors the status of the links. The monitoring program 40a queries operating system data in order to get status of attempts for communication links. The attempts for the communication links are identified by the F values (i.e. identity of switch port 28a,b,c . . . and internal switch), E values (i.e. identity of target storage server and target storage server port) and status of this link (i.e. active or failed), and the identity of the target hard disk. If the operating system is not able to communicate with a particular hard disk, the operating system sets the status of this hard disk to "failed". Otherwise, the operating system sets the status of this hard disk to "active". If there are any problems in making this communication, then either an error message is sent to the application server, or nothing is returned to the application server. In either case, the operating system 21 sets the status of the attempted link as "failed" (step 58). As explained above, the monitoring program 40a records status of each hard disk (which represents the link or access path to the hard disk) by a set of values for $S_i$, $F_i$, $E_i$, $M_i$. according to data provided by the operating system with respect to the hard disk.

To compile these records, the monitoring program 40a builds a list of $F_i$, i=1 . . . $N_f$ leading to each hard disk. Then, the monitoring program 40a builds a list of $E_j$, j=1 . . . $N_e$ leading to each hard disk. Then, the monitoring program builds a list of all possible combinations of switch ports 28a,b,c . . . and storage server ports (i.e. $F_i$,$E_j$) that can be used to access each hard disk. There will be $N_f \times N_e$ such combinations. Next, for each combination ($F_i$, $E_j$), monitoring program 40a determines a final status "S" and "M" as follows. The monitoring program 40a builds a list of hard disks (i.e. their links or access paths) which the application server 20a links to the managing storage server via the same pair of switch ports 28a,b,c . . . and storage server ports ($F_i$, $E_j$). If the status of each hard disk in that list is the same (active or failed), then the status "S" for that pair/link is that status (active or failed). However, if the status of each link to that hard disk in the list is not the same, then the status "S" for that pair/link is "Other". The status of "Other" means that something may be wrong with the application server itself.

Figure 4:
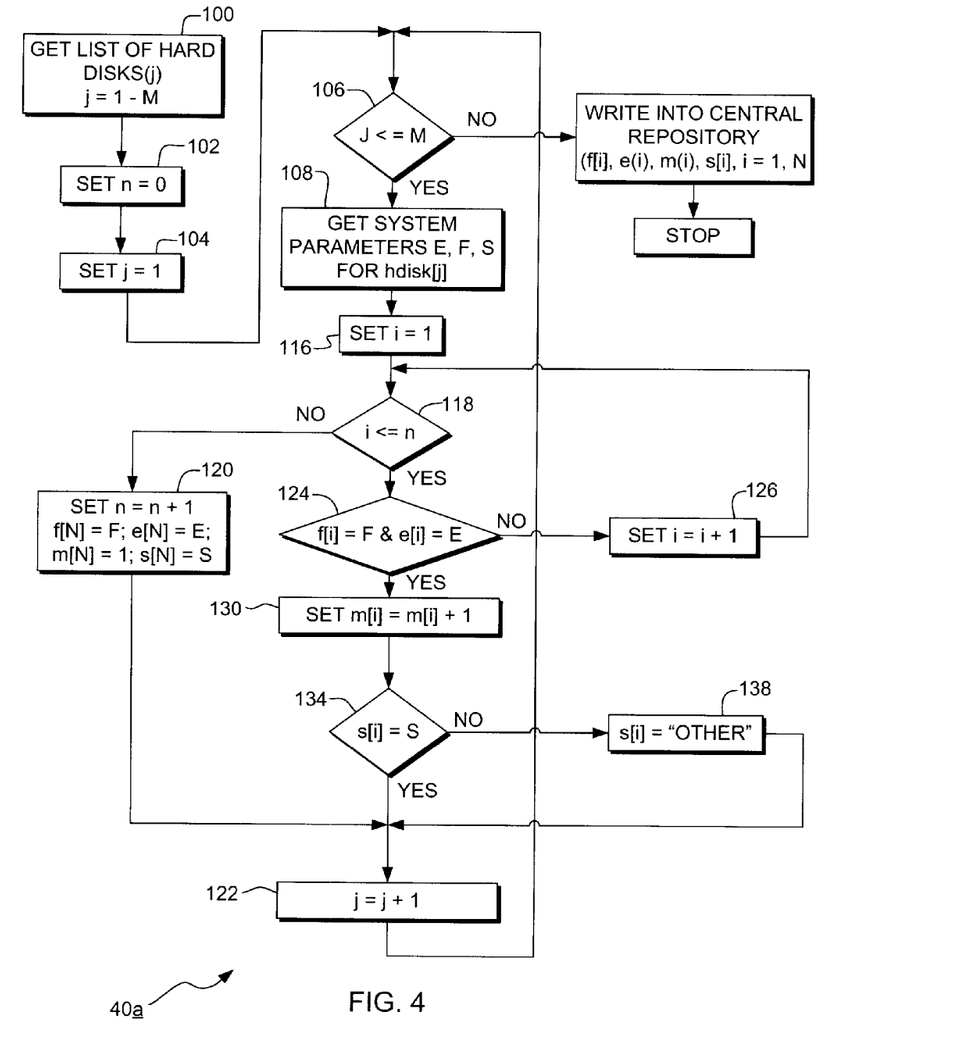
FIG. 4 is a flow chart illustrating another function of the monitoring program of the application server of FIG. 1 which compiles the records of attempts and their results, and furnishes the compiled records to the problem analysis server.
Figure 5:
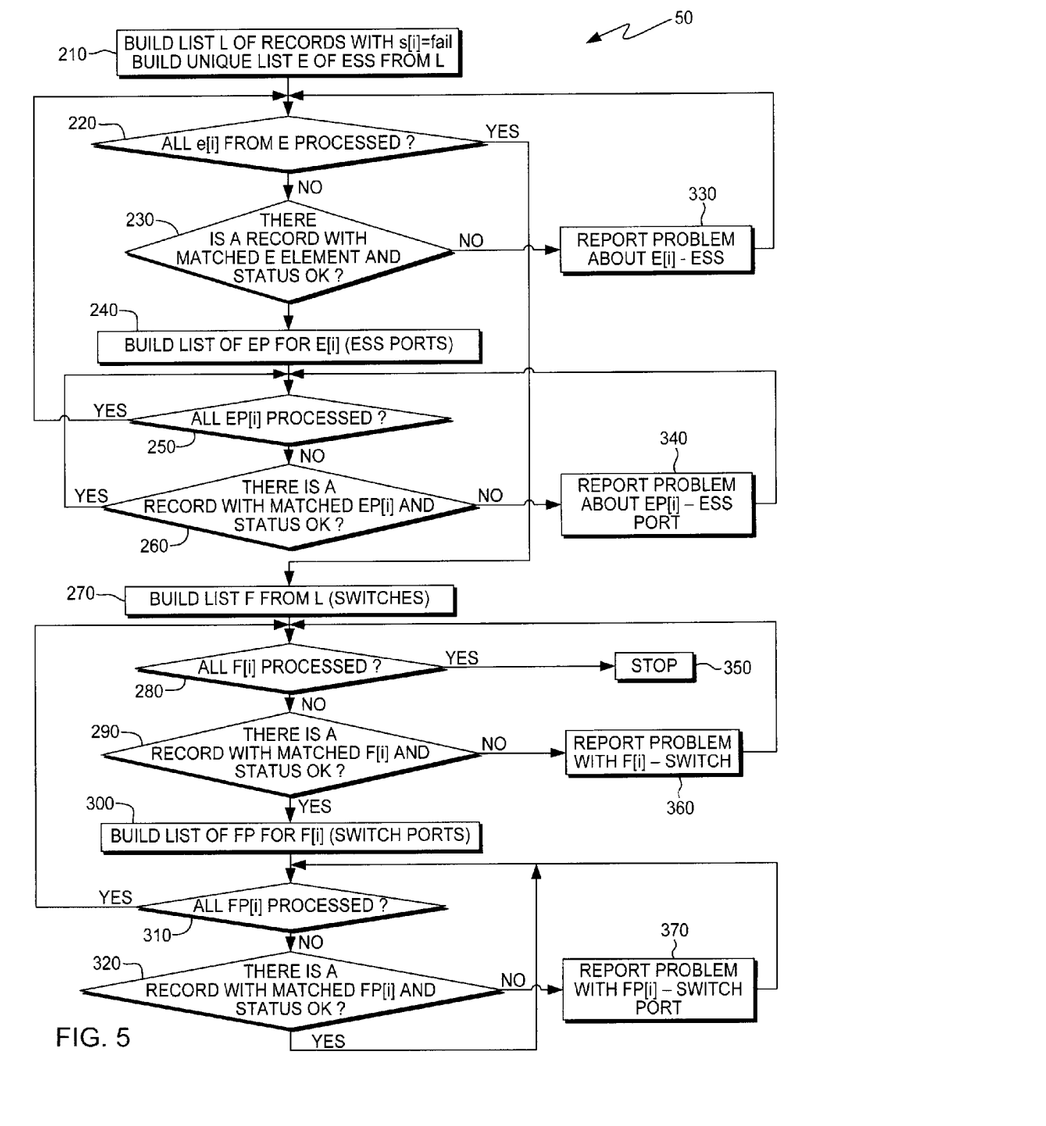
FIG. 5 is a flow chart illustrating function of the problem analysis program of FIG. 1 which automatically identifies which component of the computer system of FIG. 1 has failed, based on the compiled information supplied by the application servers.

FIG. 4 illustrates in more detail the foregoing function of each of the monitoring programs 40a,b,c . . . within their respective application servers 20a,b,c . . . to compile the records of the links and their status, and supply them to the problem analysis server 52. (FIG. 5 illustrates the function of the problem analysis program 50 to automatically determine which components have failed, based on these compiled records supplied by the monitoring programs of the different application servers.) Each of the monitoring programs 40a, b,c . . . functions in the same way; for ease of explanation, the description of FIG. 4 is applied to just one of them. In step 100, the monitoring program 40a obtains from a system file within the application server a list of hard disks that are accessible to the application server 20a. Each one of these hard disks is represented by an integer value for a variable "j" beginning with "j=1". There are a total of "M" such hard disks, so the monitoring program 40a obtains a list of M hard disks. Then, monitoring program 40a initializes a variable "n" to one to represent a first one of the links (step 102); the final value of "n" equals "N" which is the total number of links attempted by the application server 20a. Then, monitoring program 40a reinitializes the variable "j" equal to one to represent a first one of the hard disks (step 104). Next, monitoring program determines if the integer "j" is less than the value "M" meaning that fewer than all of the hard disks have yet to be analyzed (decision 106). If so, monitoring program 40a determines from configuration file 37a the link to the "current" hard disk, and defines this link by an F value and an E value (step 108). The monitoring program 40a also determines the latest status, active or failed, of the latest or most recent communication attempt by application server 20a to establish this link (step 108). This determination is made based on the records made by the monitoring program 40a during previous communication attempts.

Then, monitoring program 40a initializes a variable "i" to one (step 116). Each integer value for the variable "i" represents a specific link represented by a respective F value and E value. Then the monitoring program checks if the variable "i" is less than or equal to the variable "n" (decision 118). In the first iteration of the steps of FIG. 4, this will not be the case, so the monitoring program 40a proceeds to step 120 to set the variable "f" equal to the F value for the current hard disk (The variable f[i] represents an internal switch 31a or b or c . . . and a switch port 28a or b or c . . . .) In step 120, the monitoring program 40a also sets the variable "e" equal to the E value for the current hard disk. In step 120, the monitoring program 40a also sets the variable "m" equal to one for the current hard disk. (As explained above, from the viewpoint of the application server and its operating system 21, each hard disk represents an access path or link to the storage server.) In step 120, the monitoring program 40a also set the variable "s" equal to the latest status of the link to the current hard disk, and increment the variable "n". The index "j" represents a hard disk. The index "i" represents an element of a list of links that are built. For each hard disk, the monitoring program 40a checks whether there is an element for the hard disk in the list. If not, the monitoring program 40a adds a new element to the list. When j=1, indicating the first hard disk, the list is initially empty, so the monitoring program 40a proceeds to add an element to the list, as follows. The monitoring program 40a proceeds to step 122 to increment the variable "j", and then loops back to decision 106. During the next iteration, the value for variable "i" will be less than the value for the variable "n", and therefore, decision 118 leads to decision 124. In decision 124, monitoring program 40a determines if the current values for the variables "f" and "e" match those of the current hard disk. If this combination does not match (decision 124, no branch), then it is not relevant to the analysis of the status of the current hard disk, and the monitoring program 40a increments the variable "i" (step 126) and returns to decision 118 to consider the next link number "i". However, if the current combination of variables "f" and "e" matches the link to the current hard disk (decision 124, yes branch), then the monitoring program 40a increments the variable "m" (step 130), and checks the status of this link attempt for the current hard disk (decision 134). If the status for this link attempt does not match the status for this link recorded in step 108 (decision 134, no branch), then the monitoring program 40a sets the status for this link to "Other" (step 138). After step 138, the monitoring program 138 proceeds to step 122. After decision 134, yes branch where the status for this link attempt matches the status for this link recorded in step 108, then the monitoring program does not change the status for this link, and proceeds to step 122 without changing the status for this link. (The reason that step 122 follows step 138 and decision 134, yes branch is the following. The list of links built by monitoring program 40a contains unique elements, i.e. no repeats. Therefore, if there is an element in the list which corresponds to the current hard disk, the monitoring program 40a does not need to compare the parameters of the current hard disk to any other elements in the list.) Then, the value of "i" is incremented (step 126)?? If the value of "i" is still less than or equal to the value of "n", then decision 118 leads to decision 124 and the foregoing process is repeated. However, when the value of "i" is greater than the value of "n", then the monitoring program 40a resets the values of "f", "e", "m", and "s" in step 120 to equal those for the next hard disk as recorded in step 108. Then, the monitoring program increments the variable "j" in step 122 and loops back to decision 106 to repeat the foregoing analysis of the communication attempts to the next hard disk.

When the foregoing compilation is performed for all the hard disks and all of the links leading to each hard disk, such that the variable "j" equals the value "M", then monitoring program 40a sends the compilation of (application server id, $F_i, E_j, S_{ij}, M_{ij}$) for each hard disk to the problem analysis server 52 to store in a central repository 51 (step 150). This record represents the many combinations of application server id, switch port 28a,b,c . . . , storage server port identity, link status and hard disk identity, for each hard disk.

When an application server cannot access a hard disk via the switch fabric and a storage server or an administrator wants to check current status of the switch fabric 24, the administrator can query the problem analysis program 50 to assist in identifying the failed component. The problem analysis program 50 uses the compiled information furnished from all the application servers 20a,b,c . . . and stored in the central repository 51 to identify the failed component. First, the problem analysis program 50 builds a list "L" of records for links with failed status. Then, problem analysis program 50 builds a list "E" of storage servers from list "L". Then, for each storage server from list "E", problem analysis program 50 checks if there is a record in the central repository with status "active". If not, then problem analysis program 50 determines that there is a problem with the storage server. This is because no application server can access the hard disk through any storage server port. However, if there is a record in the central repository with status "active" for a storage server, then problem analysis program 50 checks for a problem with a storage server port on this storage server as follows. Problem analysis program 50 builds a list "EP" of storage server ports for this storage server. Then, for each storage server port from the list "EP" for this storage server, problem analysis program 50 checks if there is a record in the central repository 51 with status "active". If not, then problem analysis program 50 determines that there is a problem with the storage server port. However, if there are no records with status "active" for a storage server port, problem analysis program 50 determines that the storage server port has failed, and loops back to check the next storage server port from the list "EP". After all the storage server ports have been so checked, problem analysis program 50 loops back to check the next storage server from list "EP", until all the storage servers have been analyzed.

Next, problem analysis program 50 builds a list "F" of combinations of internal switches of switch fabric 24 from list "L". For each switch from list "L", problem analysis program 50 checks if there is a record in the central repository 51 with status "active". If not, then problem analysis program 50 determines that there is a problem with the internal switch, and then loops back to check the next internal switch from list "L". However, when there is a record in the central repository with status "active" for the internal switch from the list "L", problem analysis program 50 builds separate lists "FP" of switch ports 28a,b,c . . . for the internal switch; there can be and typically are more than one switch port sharing the same internal switch. Then, for each switch port 28a,b,c . . . from each list "FP" for the internal switch, problem analysis program 50 checks if there is a record in the central repository with status "active". If not, then problem analysis program 50 determines that there is may be problem with the application server port (for example, fiber channel adapter card port), the cable from the application server port to the switch port or the switch port.

Next, problem analysis program 50 compiles the list of potentially failed components, i.e. application servers, application server ports or cables between the application server ports and the switch fabric, switch port 28a,b,c . . . , storage server ports, or storage servers or cable from the switch fabric to the storage server. While some of the components on this list may not have failed, it greatly reduces the number of components to be tested by the administrator. Also, the problem analysis program 50 provides the list of potentially failed components without requiring any additional program agents on the storage server or switch fabric.

FIG. 5 illustrates the foregoing function of problem analysis program 50 in more detail. In step 210, the problem analysis program builds list "L" by selecting from central repository 51 all records with status "failed". Then, the problem analysis program builds a unique list E of storage servers referenced in list L. In decision 220, the problem analysis program checks whether all storage servers from list E are processed. If YES, then the problem analysis program proceeds to step 270. If Not, i.e. there is at least one storage server in list E yet to be processed, then the problem analysis program proceeds to decision 230 to obtain a list of records from the central repository which match current unprocessed storage server. If none of these records has status "active" (decision 230, no branch), then the problem analysis program reports a problem with the entire storage server E[i] (step 330) and loops back to decision 220 to determine whether there are any other storage servers yet to be processed on list E. If so, then the problem analysis program repeats decision 230 for the next storage server. If there is a record in the repository with status "active" for the current storage server E[i], then the problem analysis program proceeds to step 240 to build a unique list "EP" of all ports for the current storage server E[i] from the central repository. Then, the problem analysis program proceeds to decision 250 to check whether all entries in the list EP are processed. If so, then the analysis is complete for the current storage server E[i], and the problem analysis program loops back to decision 220 to process the next storage server from the list E. Referring again to decision 250, no branch, where all the entries in the list "EP" are not yet processed, then the problem analysis program proceeds to decision step 260 to determine if there is a record from the repository which matches the current storage server an storage server port from list EP, and has status "active". If not, (decision 260, no branch), then the problem analysis program reports a problem with the current storage server port EP[j] (step 340). Then, the problem analysis program loops back to decision 250 to process the next storage server port. Referring again to decision 260, yes branch where there is an entry from the list "EP" for this storage port with status "active", then there is not a problem with the storage server port, and the problem analysis program loops back to decision 250 to process the next storage server port from the list "EP".

After all the storage servers from the list "E" have been so processed (decision 220, yes branch), the problem analysis program proceeds to step 270 to start processing switch fabric switches to determine any problems with them or the associated application servers. In step 270, the problem analysis program builds a unique list "F" of switch fabric switches referenced in list L. Then, the problem analysis program proceeds to decision 280 to check whether all entries in the list "E" are processed. If so, then the analysis is completed (step 350). However, referring to decision 280, no branch where there is at least one entry not yet processed, then the problem analysis program obtains the status of all records from the central repository which match the current unprocessed switch fabric switch from the list "F". If there is no record with status "active" (decision 290, no branch), then the problem analysis program proceeds to step 360 to report a problem with the switch fabric switch F[i]. Then, the problem analysis program loops back to decision 280 to process the next entry from the list "F". Referring again to decision 290, yes branch where there is at least one record with status "active for this switch port, then the problem analysis program proceeds to step 300 to build a unique list "FP" of switch fabric ports from the central repository where records match the current switch F[i]. Then, the problem analysis program proceeds to decision 310 to determine if there are any such switch fabric ports in the list "FP" yet to be processed. If all the switch ports have been processed (decision 310, yes branch), then the problem analysis program loops back to step 280 to process the next switch from list "F". However, if all the switch ports for this switch have not yet been processed (decision 310, no branch), then the problem analysis program proceeds to decision 320 to determine if there is a record from the central repository which matches this switch port, i.e. FP[j], and has status "active". If not, then the problem analysis program reports a problem with the switch port or application server adapter or cable interconnecting the application server adapter card to the switch port (step 370). Then, the problem analysis program loops back to step 310 to process next the switch port. Referring again to decision 320, yes branch where there is at least one record for this switch port with status "active, then the problem analysis program (does not mark the switch port as failed, and) loops back to decision 310 to process the next switch port.

The monitoring programs 40a,b,c . . . also compile records regarding the amount of usage of each hard disk by their own application servers, and supply these compilations to the problem analysis server 52. From these compilations, the problem analysis program 50 determines (a) the number of servers that are connected to each storage server and/or storage server port, and (b) the number of hard disks that are accessible by each combination of switch fabric switch, storage server port and storage server. Then, the problem analysis program 50 determines the number of hard disks accessed by the different storage servers and storage server ports. For administrative purposes, an administrator can query the central repository for this information regarding usage. For example, if an administrator is planning a change to a storage server or switch fabric switch, the administrator can query the central repository for a list of servers potentially affected in case of outage of a particular switch fabric switch, storage server port or storage server.

The problem analysis program 50 also calculates cumulative throughput for each hard disk via each link based on the foregoing usage information and records of S and M values. The problem analysis program 50 can also calculate throughput via each application server, application server port, switch fabric switch, storage server port and storage server.

Based on the foregoing, a system, method and program for identifying a failed component in a system comprising an application server, a storage server and a switch fabric have been disclosed. However, numerous modifications and substitutions can be made without deviating from the scope of the present invention. For example, the foregoing records from the central repository 51 can be used to determine the number of application servers attached to each switch, and the number of application servers using each storage server or storage server port. These counts can be used for capacity planning. Therefore, the present invention has been disclosed by way of illustration and not limitation, and reference should be made to the following claims to determine the scope of the present invention.

The invention claimed is:

1. Apparatus for identifying a failed component in a system comprising application servers, storage servers and a switch fabric, said switch fabric having first ports coupled to said application servers to receive requests to access storage managed by said storage servers, second ports coupled to third ports of said storage servers to forward the access requests to said storage servers and receive responses from said storage servers, and internal switches to interconnect said first ports to second ports to pass said requests and responses through said switch fabric, said apparatus comprising:

means for receiving from each of said application servers records of its own attempts to communicate with said storage servers via said switch fabric, each of said records indicating one of said third ports and one of said storage servers for each of said communication attempts; and means for determining from said records if any of said communications was successful to one of said storage servers, and if not, determining that said one storage server may have failed, and if so, determining that said one storage server is active and determining from said records if any of said communications was successful to each of said third ports of said one storage server, and if not, determining that said each third port of said one storage server may have failed, and if so, determining that said each third port of said one storage server is active;

and wherein each of said records also indicates one of said first ports and one of said switches for said each communication attempt, and further comprising:

means for determining from said records if any of said communications was successful to each of said switches leading to said each third port of said one storage server, and if not, determining that said each switch may have failed, and if so, determining that said each switch is active and determining from said records if any of said communications was successful to each of said first ports connected to said each switch leading to said one storage server, and if not, determining that said each first port connected to said each switch leading to said one storage server or a connection between one of said application servers and said each first port connected to said each switch leading to said one storage server may have failed, and if so, determining that said each first port connected to said each switch leading to said one storage server is active.

2. Apparatus as set forth in claim 1 wherein said switch fabric is hardwired to said application servers and said storage servers.

3. Apparatus as set forth in claim 2 wherein said applications servers communicate with storage server via said fabric switch using fiber channel protocol.

4. A computer program product for identifying a failed component in a system comprising application servers, storage servers and a switch fabric, said switch fabric having first ports coupled to said application servers to receive requests to access storage managed by said storage servers, second ports coupled to third ports of said storage servers to forward the access requests to said storage servers and receive responses from said storage servers, and internal switches to interconnect said first ports to second ports to pass said requests and responses through said switch fabric, said computer program product comprising:

a computer readable medium;

first program instructions to receive from each of said application servers records of its own attempts to communicate with said storage servers via said switch fabric, each of said records indicating one of said third ports and one of said storage servers for each of said communication attempts; and second program instructions to determine from said records if any of said communications was successful to one of said storage servers, and if not, determine that said one storage server may have failed, and if so, determine that said one storage server is active and determine from said records if any of said communications was successful to each of said third ports of said one storage server, and if not, determine that said each third port of said one storage server may have failed, and if so, determine that said each third port of said one storage server is active; and wherein each of said records also indicates one of said first ports and one of said switches for said each communication attempt, and further comprising:

third program instructions to determine from said records if any of said communications was successful to each of said switches leading to said each third port of said one storage server, and if not, determine that said each switch may have failed, and if so, determine that said each switch is active and determine from said records if any of said communications was successful to each of said first ports connected to said each switch leading to said one storage server, and if not, determine that said each first port connected to said each switch leading to said one storage server or a connection between one of said application servers and said each first port connected to said each switch leading to said one storage server may have failed, and
   if so, determine that said each first port connected to said each switch leading to said one storage server is active; and wherein
said first, second and third program instructions are recorded on said medium.

5. A computer program product as set forth in claim 4 wherein said switch fabric is hardwired to said application servers and said storage servers.

6. A computer program product as set forth in claim 5 wherein said applications servers communicate with storage server via said fabric switch using fiber channel protocol.

\* \* \* \* \*